United States Patent [19]

Guyer

[11] Patent Number: 5,065,046
[45] Date of Patent: Nov. 12, 1991

[54] METHOD AND APPARATUS FOR PARAMETRIC GENERATION OF MIDINFRARED LIGHT IN KNBO3

[75] Inventor: Dean R. Guyer, Bellevue, Wash.

[73] Assignee: Amoco Corporation, Chicago, Ill.

[21] Appl. No.: 619,123

[22] Filed: Nov. 28, 1990

[51] Int. Cl.$^5$ .............................................. H03F 7/00
[52] U.S. Cl. ...................................... 359/330; 372/21
[58] Field of Search .................. 372/21, 75; 307/425, 307/428

[56] References Cited

U.S. PATENT DOCUMENTS 4,879,722 11/1989 Dixon et al. ............................ 372/21
4,884,276 11/1989 Dixon et al. ............................ 372/21

*Primary Examiner*—Frank Gonzalez
*Assistant Examiner*—Susan S. Morse
*Attorney, Agent, or Firm*—Norval B. Galloway; William H. Magidson; Ralph C. Medhurst

[57] ABSTRACT

A method and apparatus for parametric conversion of electromagnetic radiation in $KNbO_3$ crystals of optical energy at a wavelength near 1 $\mu m$ to optical energy at wavelengths in the range from 1.4 $\mu m$ to 4.6 $\mu m$. A pump beam and a signal beam impinge on a $KNbO_3$ crystal and interact to produce optical energy at an idler wavelength and a signal wavelength at the expense of optical energy of the impinging pump beam wavelength. The $KNbO_3$ crystal has an orientation axis which is aligned with the direction of the impinging pump and signal energy and is on a locus defined by a minimum phase relation between the energy at the pump, signal, and idler frequencies.

7 Claims, 2 Drawing Sheets

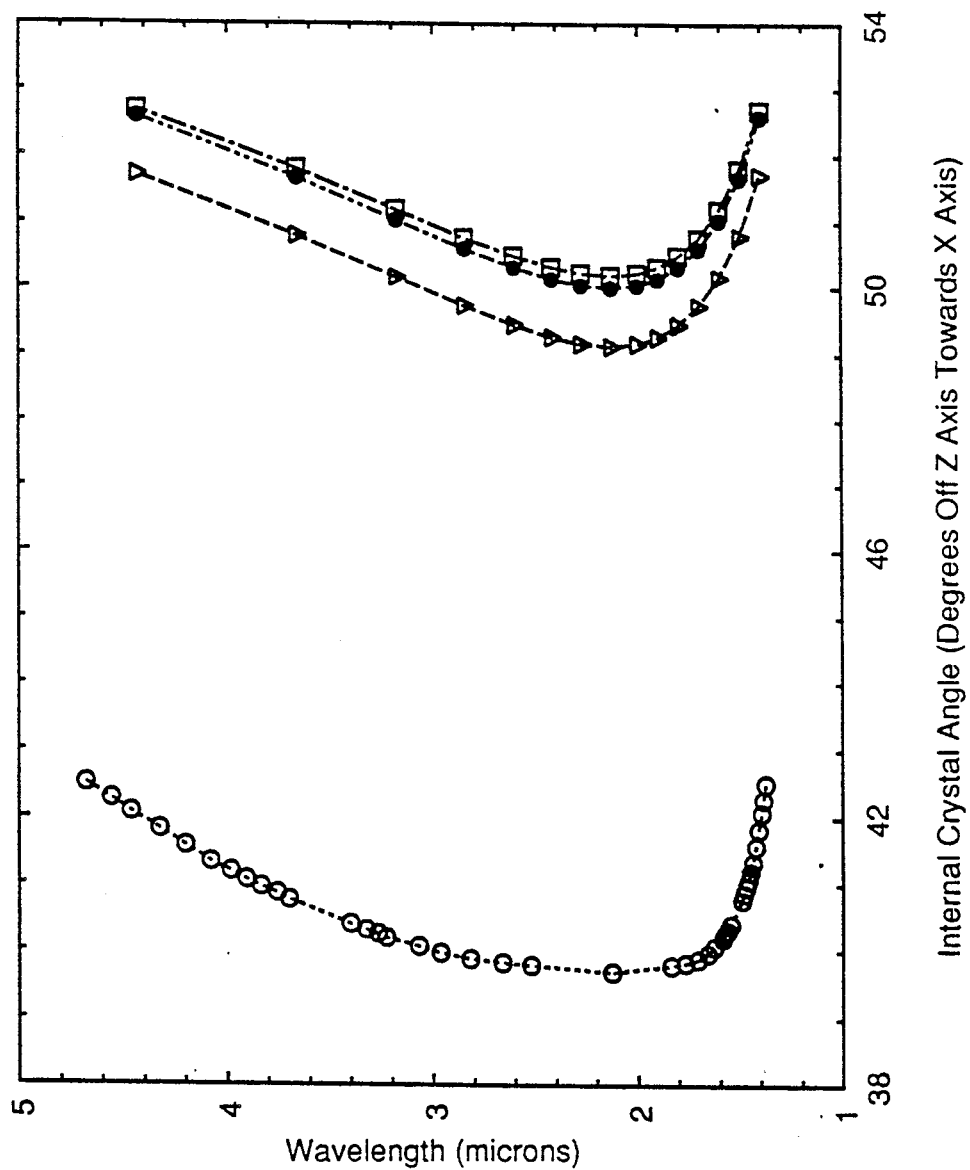

METHOD AND APPARATUS FOR PARAMETRIC GENERATION OF MIDINFRARED LIGHT IN KNBO₃

TECHNICAL FIELD

The present invention relates, in general, to a method and apparatus for parametric generation of electromagnetic energy, and more particularly, to a method and apparatus for parametric conversion of electromagnetic radiation in $KNbO_3$ crystals of wavelengths near 1 μm to wavelengths in the range from 1.4 μm to 4.6 μm.

BACKGROUND OF THE INVENTION

The conversion of light from one frequency to another in optical crystals using induced quadratic nonlinearities proceeds by a three-wave interaction process which has been described by Bierlein and Gier in U.S. Pat. No. 3,949,323.

Briefly, the conversion of light from one frequency to another using the quadratic nonlinearity term of the induced polarization in a medium (such as a crystal) having nonlinear optical properties gives rise to the phenomena of sum and difference frequency mixing. This is a catalytic process as it occurs with essentially no exchange of energy between the medium and the electromagnetic fields. Energy conveneration requires that the three frequencies involved, herein called the pump ($\omega_p$), signal ($\omega_s$) and idler ($\omega_i$) frequencies, meet the condition:

$$\omega_p = \omega_s + \omega_i$$

For efficient energy conversion to occur, it is also required that the momentum or phase velocity of the interacting electromagnetic fields be matched while propagating through the medium. This phase matching requirement is defined by the k vectors of the individual waves as:

$$\Delta k = k_p - k_s - k_i$$

where $k = \omega n(\omega)/c$, $\Delta k$ is a measure of the phase mismatch, and $n(\omega)$ is the medium index of refraction for the electromagnetic energy at frequency $\omega$. Phase matching is accomplished, and the efficiency of conversion is maximized, when $\Delta k = 0$. This is typically achieved in nonlinear crystals by rotating the crystal to an angle at which the refractive indices for the electromagnetic energy is such that phase matching is achieved.

The phase matching requirement $\Delta k = 0$ can only be met in crystals that exhibit birefringence. In isotropic media, the index of refraction, $n(\omega)$, is independent of the propagation direction and polarization orientation of the light wave, but is a function of the wave's frequency. In such media, the index generally increases with $\omega$, making phase matching impossible for real values of $\omega_p$, $\omega_s$, and $\omega_i$ satisfying the energy constraint. Anisotropic (birefringent) media also show the same trend in index variation with frequency, but the refractive index in such media is also a function of the propagation direction and polarization of the wave. The two polarization states of electromagnetic waves at a given frequency, $\omega$, in a birefringent crystal are commonly termed the ordinary and extraordinary waves and have indices $n_o(\omega)$ and $n_e(\omega)$, respectively. Both $n_o(\omega)$ and $n_e(\omega)$ are also functions of the direction of propagation with respect to the principal optical axes of the crystal, defined by the polar coordinates $\theta$ and $\phi$, and are thus fully specified as $n_o(w,\theta,\phi)$ and $n_e(w,\theta,\phi)$.

The variation of index with direction in a crystal can be spatially represented as a three-dimensional ellipsoid, which is termed the optical indicatrix. The maximum and minimum values on this indicatrix are mutually perpendicular and together with a third direction, at right angles to these two, define a Cartesian coordinate system with principal optical axes commonly referred to as x, y and z. The refractive index for any wave in any direction in the crystal, $n_{o,e}(\omega,\theta,\phi)$, can be mathematically determined from the values of the index along these principal optical axes, $n_x(\omega)$, $n_y(\omega)$, and $n_z(\omega)$.

In practice, the phase matching condition is achieved for a given parametric three-wave process by both choosing the correct polarization relation between $\omega_p$, $\omega_s$ and $\omega_i$ and orienting the crystal to give a propagation direction with respect to the crystallographic axes which results in phase matching. The collection of propagation directions in the crystal which yield phase matching for a given set of frequencies and polarizations is termed the phase matching locus. In uniaxial crystals, this phase matching locus represents a circular section of the optical indicatrix. In biaxial crystals, the phase matching locus is more complex, but is still represented as a closed curve on the optical indicatrix. In both cases, the phase matching locus tangentially intersects at most two of the three principal optical planes.

The principal refractive indices ($n_x(\omega)$, $n_y(\omega)$, and $n_z(\omega)$) for crystals are experimentally determined and are typically only known for a few select frequencies. The values at other frequencies can be estimated by fitting the measured values to analytic expressions that approximate the relationship between wavelength and the refractive index of the crystal as a function of the wavelength corresponding to the frequencies. One of the first analytic expressions to approximate the relation between wavelength and refractive index was developed by Cauchy as a series expansion in wavelength:

$$n(\lambda) = A + B/\lambda^2 + C/\lambda^4 +$$

If the index of refraction for a material is known at different wavelengths, the values of $n(\lambda)$ and $\lambda$ can be substituted into the Cauchy expression to yield a set of linear equations. The values for the Cauchy constants A, B, C, ..., can then be determined by simultaneous solution of these linear equations.

The Cauchy equation shows the general trend, seen in materials at wavelengths far removed from absorption bands, of a decreasing index with increasing wavelength. Since all transmissive materials exhibit long and short wavelength absorption limits, however, the Cauchy equation is not capable of accurately representing the variation in refractive index across a full transmission "window." Near wavelengths corresponding to frequencies the material absorbs, the refractive index of the medium deviates substantially from the form predicted by the Cauchy equation. To account for the wavelength regions near absorptions, a theoretical model was developed and, in 1871, a mathematical investigation of the mechanism involved led Sellmeier to an equation that is better at characterizing the variation of refractive indices across the transmission window of materials. This equation, like Cauchy's expression, is written as a series expansion as a function of wavelength:

$$n(\lambda)^2 = 1 + A/(1-B/\lambda^2) + C/(1-D/\lambda^2) + \ldots$$

The variables of this function are called Sellmeier coefficients. They are derived from measured values of the refractive index at different wavelengths in the same fashion as the coefficients of the Cauchy equation are obtained. The Sellmeier equation is typically only accurate in predicting principal refractive indices (and, from them, phase matching angles) in frequency regions where indices have been experimentally determined.

In $KNbO_3$, the transmission window has a short wavelength transmission edge near 0.4 $\mu$m and is transmissive over the whole visible, near and mid-infrared range out to a long wavelength transmission cut-off edge near 5 $\mu$m. The published measurements of refractive indices in $KNbO_3$, however, only cover the short wavelength range from 0.4 $\mu$m to 1.064 $\mu$m. Measurements of the refractive indices in the range between 1.1 $\mu$m and 5 $\mu$m have not been reported in the literature. The Sellmeier coefficients developed for $KNbO_3$ are based only on the indices measured between 0.4 $\mu$m and 1.064 $\mu$m. Since refractive indices near the long wavelength transmission edge were not included, the accuracy of determining principal refractive indices using these coefficients diminishes at longer wavelengths.

When the Sellmeier equation is used to predict indices for wavelengths outside the region of accuracy of the Sellmeier coefficients used in the equation, the refractive indices predicted for the frequencies corresponding to those wavelengths can lead to an erroneous calculation for the correct phase matching angle for the parametric process being considered. Erroneous values of the Sellmeier coefficients can also lead to a prediction that phase matching is possible when it is not, or conversely, to a prediction that phase matching is not possible when in fact it is.

Accordingly, there is a need in the art to provide crystal orientations of $KNbO_3$ for phase matching for frequencies outside the region where refractive indices have been experimentally determined or where phase matching has been demonstrated.

SUMMARY OF THE INVENTION

It is, accordingly, a principal object of the present invention to provide a optical parametric source that is tunable in the near and mid-infrared. More particularly, the present invention provides for a parametric source utilizing $KNbO_3$ to produce near and mid-infrared light in the range from 1.4 $\mu$m to 4.6 $\mu$m from a light source near 1 $\mu$m.

In one aspect, the invention is a nonlinear optical device. The device comprises means to direct electromagnetic radiation having at least one frequency having a wavelength near 1.$\mu$m into a crystal having nonlinear optical properties with respect to a set of crystal principal axes. This causes electromagnetic energy to emerge from the crystal, the electromagnetic energy containing at least one frequency having a wavelength in the range from 1.4 $\mu$m to 4.6 $\mu$m that increased in energy over any incident beam of radiation, wherein the improvement comprises a crystal consisting of a compound having the formula $KNbO_3$.

In another aspect, the invention is a method for generating coherent optical radiation. The method comprises the steps of (a) generating coherent near-infrared optical radiation having a pump frequency, $\omega_p$, and a wavelength of approximately 1 $\mu$m, (b) generating coherent optical radiation having a signal frequency, $\omega_s$, and a wavelength in the range between approximately 1.4 $\mu$m and approximately 4.6 $\mu$m, and (c) transmitting the coherent optical radiation at the pump and signal frequencies in a predetermined direction. The method further comprises the steps of (d) orienting a crystal comprising a compound having the formula $KNbO_3$ and having an orientation axis and an index of refraction that varies as a function of direction in the crystal with respect to the orientation axis, the orientation axis being aligned with the predetermined direction and being on the locus defined by a minimum phase relation, the locus including a direction in the plane defined by the principal axis in the direction having the highest index of refraction and the principal axis in the direction having the lowest index of refraction and being at an angle in the range between approximately 36 and approximately 46 degrees from the principal axis having the highest index of refraction, and (e) interacting said radiation having said pump frequency and said radiation having said signal frequency within the birefringent optical material to generate coherent mid-infrared optical radiation having an idler frequency, $\omega_i$, where $\omega_i = \omega_p - \omega_s$, and a wavelength in the range between approximately 1.4 $\mu$m and approximately 4.6 $\mu$m.

In a further aspect, the invention comprises an apparatus for generating coherent optical radiation. The apparatus comprises means for generating coherent near-infrared optical radiation having a pump frequency, $\omega_p$, and a wavelength of approximately 1 $\mu$m, and means for generating coherent optical radiation having a signal frequency, $\omega_s$, and a wavelength in the range between approximately 1.4 $\mu$m and approximately 4.6 $\mu$m, means for transmitting the coherent optical radiation at the pump and signal frequencies in a predetermined direction. The apparatus further comprises means for orienting a crystal comprising a compound having the formula $KNbO_3$ and having an orientation axis and an index of refraction that varies as a function of direction in the crystal with respect to the orientation axis, the orientation axis being aligned with the predetermined direction and being on the locus defined by a minimum phase relation, the locus including a direction in the plane defined by the principal axis in the direction having the highest index of refraction and the principal axis in the direction having the lowest index of refraction and being at an angle in the range between approximately 36 and approximately 46 degrees from the principal axis having the highest index of refraction, said radiation having said pump frequency and said radiation having said signal frequency interacting within the birefringent optical material to generate coherent mid-infrared optical radiation having an idler frequency, $\omega_i$, $= \omega_p - \omega_s$, and a wavelength in the range between approximately 1.4 $\mu$m and approximately 4.6 $\mu$m.

This object is achieved using $KNbO_3$ as a parametric converter by orienting a $KNbO_3$ crystal to an angle in the range from 36 to 46 degrees away from the principal axis having the highest index of refraction and toward the principal axis having the lowest refractive index to receive optical pump energy having a pump frequency near 1 $\mu$m and generate optical signal energy having a signal frequency in the range from 1.4 $\mu$m to 4.6 $\mu$m and optical idler energy having an idler frequency in the range from 1.4 $\mu$m to 4.6 $\mu$m.

BRIEF DESCRIPTION OF THE DRAWINGS

FIG. 3 is a graph comparing the phase matching angles for light generation in the range from 1.4 μm to 4.6 μm from a source near 1 μm in KNbO$_3$ as predicted using published Sellmeier coefficients and the phase matching angles discovered for this process.

DETAILED DESCRIPTION OF THE INVENTION

According to the invention, the efficiency of parametric generation of light in the range from 1.4 μm to 4.6 μm from a source near 1 μm in crystals of KNbO$_3$ can be improved by using crystals oriented to angles such that the phase mismatch between the three waves is minimized.

Figure 1:
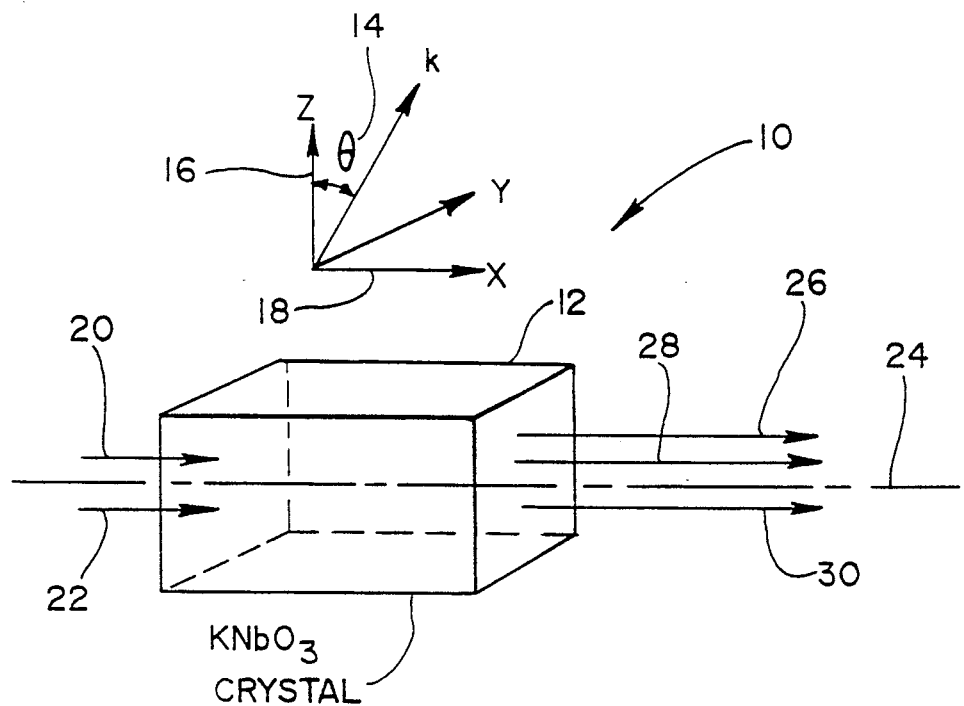
FIG. 1 is a schematic of a first embodiment of a parametric generator constructed in accordance with the invention.

FIG. 1 is a schematic diagram of a first embodiment of a parametric generator 10 using KNbO$_3$ for converting light near 1 μm to the range from 1.4 μm to 4.6 μm with the KNbO$_3$ crystal 12 oriented for phase matching in accordance with the invention. The KNbO$_3$ crystal 1 is oriented to an angle 14 ($\theta$) in the range from 36 to 46 degrees away from the principal axis 16 having the highest index of refraction (z) and generally towards the principal axis 18 having the lowest refractive index (x). The parametric generator 10 includes a pump laser source (not shown) and a signal laser source (not shown) that transmits optical pump energy 20 and optical signal energy 22 along an orientation axis 24 of the crystal 12. The crystal 12 produces optical pump output energy 26 having the same wavelength as the optical pump energy 20, and optical signal output energy 28 having the same wavelength as the optical signal energy 22. The interaction of the pump laser energy 20 and the signal laser energy 22 with the crystal 12 increases the signal output energy 28 and produces an idler output energy 30 having a frequency equal to the difference in frequency between the pump energy 20 and the signal energy 22. As an example, the pump laser source can produce light with a wavelength of 1.064 μm and the signal laser source can produce light with a wavelength of 1.5 μm. With the KNbO$_3$ crystal 12 oriented to transmit the pump and signal energies 20 and 22 at an angle $\theta$ near 40 degrees, the parametric interaction to produce idler output energy 30 at a wavelength of 3.66 μm will be phase matched and the conversion of energy from the pump energy 20 into signal and idler output energies 28 and 30 will have the highest efficiency.

In this first preferred embodiment, tuning of the idler output energy 30 is achieved by both changing the frequency of the signal energy 22 and the orientation of the KNbO$_3$ crystal 12 with respect to the orientation axis 24 such that the propagation angle of the pump energy 20 and the signal energy 22 are at the correct phase matching angle.

Figure 2:
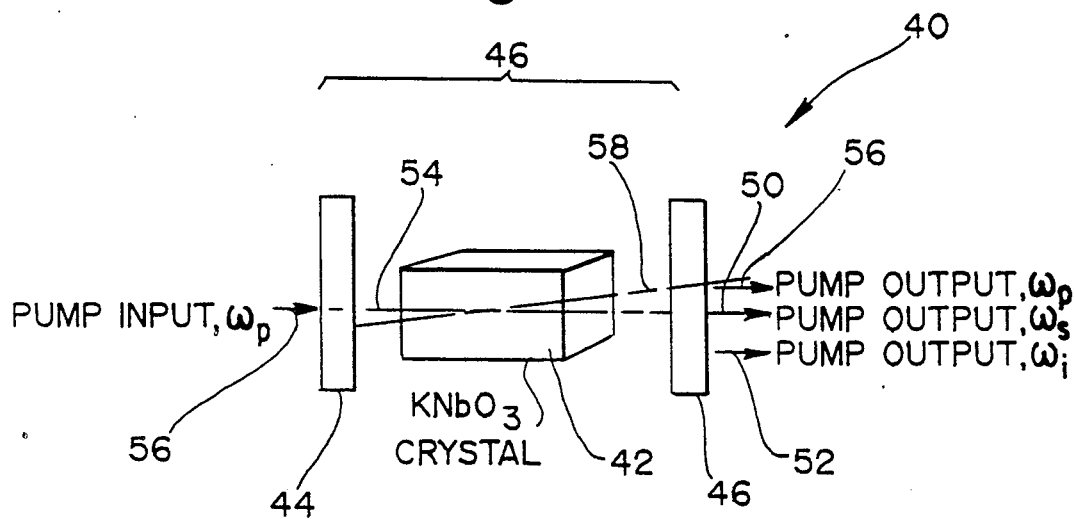
FIG. 2 is a schematic diagram of a second embodiment of a parametric source constructed in accordance with the invention.

FIG. 2 is a schematic of a second embodiment of a parametric generator 40, termed an optical parametric oscillator, using KNbO$_3$ for converting light near 1 μm to energy and wavelengths in the range from 1.4 μm to 4.6 μm with a KNbO$_3$ crystal 42 oriented for phase matching in accordance with the invention. The KNbO$_3$ crystal 42 is placed between two mirrors 44 and 46 which act as a resonant cavity 48 for one or both the signal and idler output energies 50 and 52 and oriented with respect to an orientation axis 54 of the cavity 48 by an angle $\theta$ in the range from 36 to 46 degrees away from the principal axis 16 having the highest index of refraction (z) and generally towards the principal axis 18 having the lowest index of refraction (x) (see FIG. 1). The optical parametric oscillator includes a pump laser source (not shown) that transmits optical pump energy 56 along the orientation axis 54 of the crystal 42 and an optical axis 58 of the cavity. The interaction of the pump energy 56 with the crystal 42 generates the signal output energy 50 and the idler output energy 52 having a frequency equal to the difference in frequency between the pump and signal energies. As an example, the pump laser source can produce light with a wavelength of 1.064 μm and the signal laser source can produce light with a wavelength of 1.5 μm. With the KNbO$_3$ crystal 42 oriented to transmit the pump and signal energies at an angle $\theta$ near 40 degrees, the parametric interaction to produce idler energy 52 at a wavelength of 3.66 μm will be phase matched and the conversion of energy from the pump energy 56 into signal and idler energies 50 and 52 will have the highest efficiency.

In this second embodiment, tuning of the output is achieved by changing the orientation of the KNbO$_3$ crystal 42 with respect to the orientation axis 54 such that the propagation angle of the pump input energy 56 is at the correct phase matching angle to produce the signal and idler energies 50 and 52 desired.

FIG. 3 is a graph comparing the phase matching angles for light generation in the range from 1.4 μm to 4.6 μm from a source near 1 μm in KNbO$_3$ as predicted using the current published Sellmeier coefficients and the correct phase matching angles discovered and demonstrated for this process (open circles). The values published by Wiesendanger (Ferroelectrics 1, 141 (1970)) are designated by triangles, the values published by Uematsu (Japan J. Appl. Phys. 13, 1362 (1974)) are designated by filled circles, and the values published by Baumert et al (SPIE vol. 374, ECOOSA (1984)) are designated by open squares. The internal crystal angle presented is measured in degrees away from the principal axis having the highest index of refraction and towards the principal axis having the lowest refractive index. The three curves on the right in FIG. 3 show the values calculated from the Sellmeier equation and the published Sellmeier coefficients, while the open circles in FIG. 3 show the correct orientational angles discovered and demonstrated for this conversion process.

A crystal of KNbO$_3$ cut with faces perpendicular to the phase matching angles predicted by the Sellmeier coefficients would not be phase matched for downconversion of light near 1 μm passing through the crystal in a direction perpendicular to the crystal faces. Such a crystal would need to be rotated relative to the incident light through an external angle much greater than the difference in internal angles shown in FIG. 3 to achieve the phase matching condition due to the index of refraction of the crystal. FIG. 3 shows the difference between the calculated and discovered internal angles to be roughly 10.5 degrees. As the refractive index of KNbO$_3$ is approximately 2.2 for these wavelengths, the external angle error for a crystal cut according to the Sellmeier equation would be $\sin^{-1}(2.2 * \sin(10.5 \text{ degrees})) = 23.6$ degrees. Such a large angular rotation significantly reduces the effective clear aperture for light passing through the crystal and causes significant angular dispersion between the three wavelengths involved in the process, an effect which can substantially reduce or even inhibit parametric conversion.

During a first search for a material that could convert light at 1.064 μm into light in the mid-infrared band at 2.128 μm, a crystal KNbO₃ crystal was cut with faces perpendicular to the phase matching angle in the x-z plane that corresponded to the angle predicted for the process by the published Sellmeier coefficients. This crystal was placed into an optical parametric oscillator cavity that had been successfully used previously with another material for this conversion process. No parametric conversion could be obtained with this KNbO₃ crystal at any orientation in the cavity. Since the Sellmeier coefficients were suspected to be in error for the wavelengths in use, the crystal was removed from the cavity and a source of 2.128 μm light was used to probe the crystal to find the angle at which frequency doubling to 1.064 μm would occur. Frequency doubling of 2.128 μm is the reverse of the downconversion process that was desired, but it is much easier in practice to determine phase matching angles using this method. By tilting the crystal through an angle of approximately 20 degrees with respect to the propagation direction of the light and to the normal of the crystal faces, doubling of the frequency of the light at a wavelength of 2.128 μm to a wavelength of 1.064 μm was achieved in KNbO₃ for the first time. As this angle is identical to that of the downconversion process originally sought, the crystal was placed into the optical parametric oscillator at the angle found and evidence for parametric downconversion was again sought without success. A second crystal was then cut with faces normal to the propagation direction discovered in the frequency doubling experiment. When this crystal was placed in the optical parametric oscillator cavity, parametric downconversion was immediately achieved. The failure of the first experiment with KNbO₃ crystals cut in accordance with the published Sellmeier coefficients was due to the large error in angle these coefficients predicted for proper phase matching.

The phase matching angles for downconversion of light at 1.064 μm to wavelengths across the range from 1.4 μm to 4.6 μm were determined for KNbO₃ in a fashion similar to the frequency doubling method. Two light sources were used. One was fixed at 1.064 μm and the other was tunable across the range from 1.4 μm to 2.128 μm. Both beams were made collinear and directed through a crystal of KNbO₃ cut at the angle discovered to generate light having a wavelength of 2.128 μm from light having a wavelength of 1.064 μm. The parametric interaction of these two beams in the crystal, when the crystal is oriented correctly for the phase matching process, will create a third beam with a frequency equal to the difference in frequency between the two input beams. This beam, when detected, indicated that the crystal was oriented to the correct angle to phase match the three waves. The open circles in FIG. 3 represents the results of these measurements.

While the detailed description above has been expressed in terms of a preferred embodiment, those skilled in the art will appreciate that variations and modifications can be made without departing from the true spirit and scope of the invention. Therefore, the spirit and scope of the present invention are to be limited only by the following claims.

I claim:

1. A nonlinear optical device comprising means to direct electromagnetic radiation having at least one frequency having a wavelength near 1 μm into a crystal having nonlinear optical properties with respect to a set of crystal principal axes whereby electromagnetic radiation emerging from the crystal contains at least one frequency having a wavelength in the range from 1.4 μm to 4.6 μm that increased in energy over any incident beam of radiation, wherein the improvement comprises a crystal consisting of a compound having the formula KNbO₃.

2. The nonlinear optical device of claim 1, further comprising an orientation axis of the electromagnetic radiation, the orientation axis being defined relative to the crystal principal axes at an angle between approximately 36 and approximately 46 degrees away from a principal axis having the highest index of refraction and generally toward a principal axis having the smallest index of refraction.

3. A method for generating coherent optical radiation, comprising the steps of:
(a) generating coherent near-infrared optical radiation having a pump frequency, $\omega_p$, and a wavelength of approximately 1 μm;
(b) generating coherent optical radiation having a signal frequency, $\omega_s$, and a wavelength in the range between approximately 1.4 μm and approximately 4.6 μm;
(c) transmitting the coherent optical radiation at the pump and signal frequencies in a predetermined direction;
(d) orienting a crystal comprising a compound having the formula KNbO₃ and having an orientation axis and an index of refraction that varies as a function of direction in the crystal with respect to the orientation axis, the orientation axis being aligned with the predetermined direction and being on the locus defined by a minimum phase relation, the locus including a direction in the plane defined by the principal axis in the direction having the highest index of refraction and the principal axis in the direction having the lowest index of refraction and being at an angle in the range between approximately 36 and approximately 46 degrees from the principal axis having the highest index of refraction; and
(e) interacting the radiation having the pump frequency and the radiation having said signal frequency within the birefringent optical material to generate coherent mid-infrared optical radiation having an idler frequency, $\omega_i$, where $\omega_i = \omega_p - \omega_s$, and a wavelength in the range between approximately 1.4 μm and approximately 4.6 μm.

4. Apparatus for generating coherent optical radiation, comprising means for generating coherent near-infrared optical radiation having a pump frequency, $\omega_p$, and a wavelength of approximately 1 μm
means for generating coherent optical radiation having a signal frequency, $\omega_s$, and a wavelength in the range between approximately 1.4 μm and approximately 4.6 μm;
means for transmitting the coherent optical radiation at the pump and signal frequencies in a predetermined direction; and
means for orienting a crystal comprising a compound having the formula KNbO₃ and having an orientation axis and an index of refraction that varies as a function of direction in the crystal with respect to the orientation axis, the orientation axis being aligned with the predetermined direction and being on the locus defined by a minimum phase relation, the locus including a direction in the plane defined by the principal axis in the direction having the highest index of refraction and the principal axis in the direction having the lowest index of refraction and being at an angle in the range between approximately 36 and approximately 46 degrees from the principal axis having the highest index of refraction, said radiation having said pump frequency and said radiation having said signal frequency interacting within the birefringent optical material to generate coherent mid-infrared optical radiation having an idler frequency, $\omega_i$, where $\omega_i = \omega_p - \omega_s$, and a wavelength in the range between approximately 1.4 $\mu$m and approximately 4.6 $\mu$m.

5. A method for generating coherent optical radiation, comprising the steps of:
   (a) generating coherent near-infrared optical radiation having a pump frequency, $\omega_p$, and a wavelength of approximately 1 $\mu$m;
   (b) transmitting the coherent optical radiation at the pump frequency in a predetermined direction;
   (c) orienting a crystal in an optical parametric oscillator that is resonant at one or more wavelengths between 1.4 $\mu$m and 4.6 $\mu$m, the crystal comprising a compound having the formula $KNbO_3$ and having an orientation axis and an index of refraction that varies as a function of direction in the crystal with respect to the orientation axis, the orientation axis being aligned with the predetermined direction and being on the locus defined by a minimum phase relation, the locus including a direction in the plane defined by the principal axis in the direction having the highest index of refraction and the principal axis in the direction having the lowest index of refraction and being at an angle in the range between approximately 36 and approximately 46 degrees from the principal axis having the highest index of refraction; and
   (d) interacting the radiation having the pump frequency within the birefringent optical material to generate coherent mid-infrared optical radiation having an idler frequency, $\omega_i$, and a signal frequency, $\omega_s$, where $\omega_i = \omega_p - \omega_s$, and $\omega_s$ and $\omega_i$ correspond to wavelengths in the range between approximately 1.4 $\mu$m and approximately 4.6 $\mu$m.

6. Apparatus for generating coherent optical radiation, comprising
   means for generating coherent near-infrared optical radiation having a pump frequency, $\omega_p$, and a wavelength of approximately 1 $\mu$m;
   means for transmitting the coherent optical radiation at the pump and signal frequencies in a predetermined direction;
   means for orienting a crystal in an optical parametric oscillator that is resonant at one or more wavelengths between 1.4 $\mu$m and 4.6 $\mu$m, the crystal comprising a compound having the formula $KNbO_3$ and having an orientation axis and an index of refraction that varies as a function of direction in the crystal with respect to the orientation axis, the orientation axis being aligned with the predetermined direction and being on the locus defined by a minimum phase relation, the locus including a direction in the plane defined by the principal axis in the direction having the highest index of refraction and the principal axis in the direction having the lowest index of refraction and being at an angle in the range between approximately 36 and approximately 46 degrees from the principal axis having the highest index of refraction; and
   means for interacting said radiation having said pump frequency within the birefringent optical material to generate coherent mid-infrared optical radiation having an idler frequency, $\omega_i$, and a signal frequency, $\omega_s$, where $\omega_i = \omega_p - \omega_s$, and $\omega_s$ and $\omega_i$ correspond to wavelengths in the range between approximately 1.4 $\mu$m and approximately 4.6 $\mu$m.

7. The apparatus of claim 6, wherein the means for interacting said pump frequency radiation within the birefringent optical material comprises an optical parametric oscillator that is resonant at one or more wavelengths between 1.4 $\mu$m and 4.6 $\mu$m.

* * * * *